(12) United States Patent
Miyanishi et al.

(10) Patent No.: US 6,856,478 B1
(45) Date of Patent: Feb. 15, 2005

(54) INDICATOR PANEL FOR VEHICLE INSTRUMENT PANEL AND METHOD OF MANUFACTURE THEREOF

(75) Inventors: Tetsuto Miyanishi, Saitama (JP); Tetsuji Ohta, Saitama (JP)

(73) Assignees: Calsonic Kansei Corporation, Tokyo (JP); Kimoto Co., Ltd., Tokyo (JP)

( * ) Notice: Subject to any disclaimer, the term of this patent is extended or adjusted under 35 U.S.C. 154(b) by 0 days.

(21) Appl. No.: 10/805,087

(22) Filed: Mar. 19, 2004

(30) Foreign Application Priority Data

Mar. 19, 2003 (JP) .................................. P2003-075547

(51) Int. Cl.$^7$ ................................................ G02B 5/22
(52) U.S. Cl. ....................... 359/885; 362/29; 362/489
(58) Field of Search ................................ 359/885, 893; 362/29, 30, 489; 116/334, 335

(56) References Cited

FOREIGN PATENT DOCUMENTS

| EP | 0 781 668 A2 | 7/1997 |
|---|---|---|
| JP | 11-231813 | 8/1999 |
| JP | 2001-26099 | 1/2001 |
| JP | 2002-148079 | * 5/2002 |
| JP | 2002-156252 | 5/2002 |
| JP | 2002-160549 | 6/2002 |
| JP | 2002-181593 | 6/2002 |

* cited by examiner

*Primary Examiner*—Drew A. Dunn
*Assistant Examiner*—Leo Boutsikaris
(74) *Attorney, Agent, or Firm*—Brenda O. Holmes; Kilpatrick Stockton LLP

(57) ABSTRACT

An indicator panel for a vehicle instrument panel is provided with a base substrate having transparency, an ink-acceptance layer coated on at least one surface of the base substrate and a shading layer coated further on the ink-acceptance layer. Hazes of the base substrate and the ink-acceptance layer are more than 92.8% and less than 93.5%.

5 Claims, 3 Drawing Sheets

INDICATOR PANEL FOR VEHICLE INSTRUMENT PANEL AND METHOD OF MANUFACTURE THEREOF

BACKGROUND OF THE INVENTION

1. Field of the Invention

The present invention relates to an indicator panel, which is illuminated by backlighting, for a vehicle instrument panel.

2. Description of the Related Art

It is generally known to provide an instrument panel disposed in an occupant compartment of a vehicle and in front of seated occupants therein. The instrument panel is provided with an indicator panel including meters or gages such as a speedometer, engine tachometer and the like. For the meters or gages, a plurality of indicia such as numerals and scales are printed by screen printing. The indicia are colored in desired colors and have transparency so as to show desired illumination colors in a case where a backlight is turned on. The indicator panel is provided with another indicia for warning, which are colored in similar colors with a base color of the indicator panel but show illumination colors when a backlight is turned on so that the occupants become aware of the warning only when the backlight is turned on.

SUMMARY OF THE INVENTION

As mentioned above, the indicia are generally printed by screen printing and ink-Jet printing could not be applied.

The present invention is intended for providing a constitution of an indicator panel which can be manufactured with an ink-jet printing method and a manufacture method thereof.

In the following description, "haze" and "total luminous transmittance" are optical properties of transparent plastics prescribed in Japanese Industrial Standards ("JIS" hereinafter). Definitions and determination method of the haze and the total luminous transmittance are described in JIS K7105.

According to a first aspect of the present invention, an indicator panel for a vehicle instrument panel is provided with a base substrate having transparency, an ink-acceptance layer coated on at least one surface of the base substrate and a shading layer coated further on the ink-acceptance layer, wherein haze of the base substrate and the ink-acceptance layer is more than 92.8% and less than 93.5%.

Preferably, total luminous transmittance of the base substrate and the ink-acceptance layer is not less than 40% and less than 60%.

More preferably, the shading layer is provided with one or more layers.

According to a second aspect of the present invention, a method for manufacturing of an indicator panel for a vehicle instrument panel is provided with coating an ink-acceptance layer on at least one surface of a base substrate so that haze of the ink-acceptance layer and the base substrate is more than 92.8% and less than 93.5% and printing a shading layer on the ink-acceptance layer.

Preferably, total luminous transmittance of the base substrate and the ink-acceptance layer is not less than 40% and less than 60%.

DETAILED DESCRIPTION OF THE PREFERRED EMBODIMENT

Throughout the specification, haze and total luminous transmittance are defined and determined in accordance with descriptions of Japanese Industrial Standard JIS K7105.

An embodiment of the present invention will be described hereinafter with reference to FIGS. 1 through 3.

Figure 1:
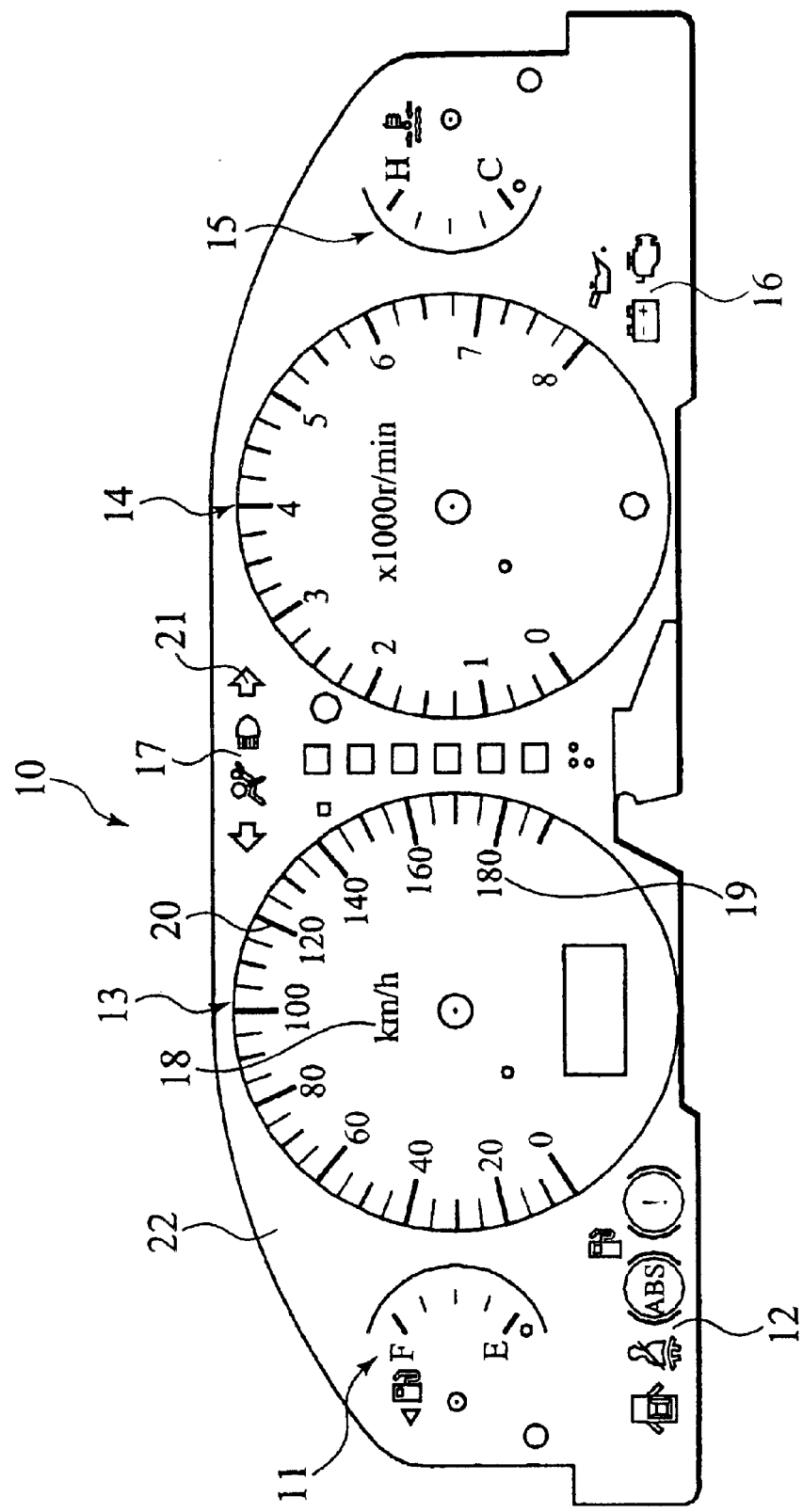
FIG. 1 is a front view of an indicator panel for a vehicle instrument panel according to an embodiment of the present invention.

An indicator panel 10 for a vehicle instrument panel is provided with a fuel meter 11 on the left hand thereof and first warning indicators 12 below the fuel meter 11 as shown in FIG. 1. A speedometer 13 and an engine tachometer 14 are disposed in the middle thereof. A coolant thermometer 15 and second warning indicators 16 are disposed on the left hand. Third warning indicators 17 are further provided between and above the speedometer 13 and the engine tachometer 14.

A plurality of indicia such as letters, numerals, scales and characters are printed on the indicator panel 10. For example, the speedometer 13 includes letters 18 such as "km/h", numerals 19 such as "180" indicating speeds and scales 20. The third warning indicators 17 include arrows 21 for a turn signal. A background portion excepting the indicia is a shading portion 22 colored in black or such a dark color.

The indicator panel 10 can be generally classified into three groups. First of them is a group of transparent portions of letters 18, scales 20 and such, which have transparency so as to show desired illumination colors in a case where a backlight is turned on. Second is a group of the first through third warning indicators 12, 16 and 17, which are colored in similar colors with the shading portion 22 but show illumination colors when a backlight is turned on so that the occupants become aware of the warning only when the backlight is turned on. Third is the shading portion 22 which have no indicia and opacity.

Figure 2:
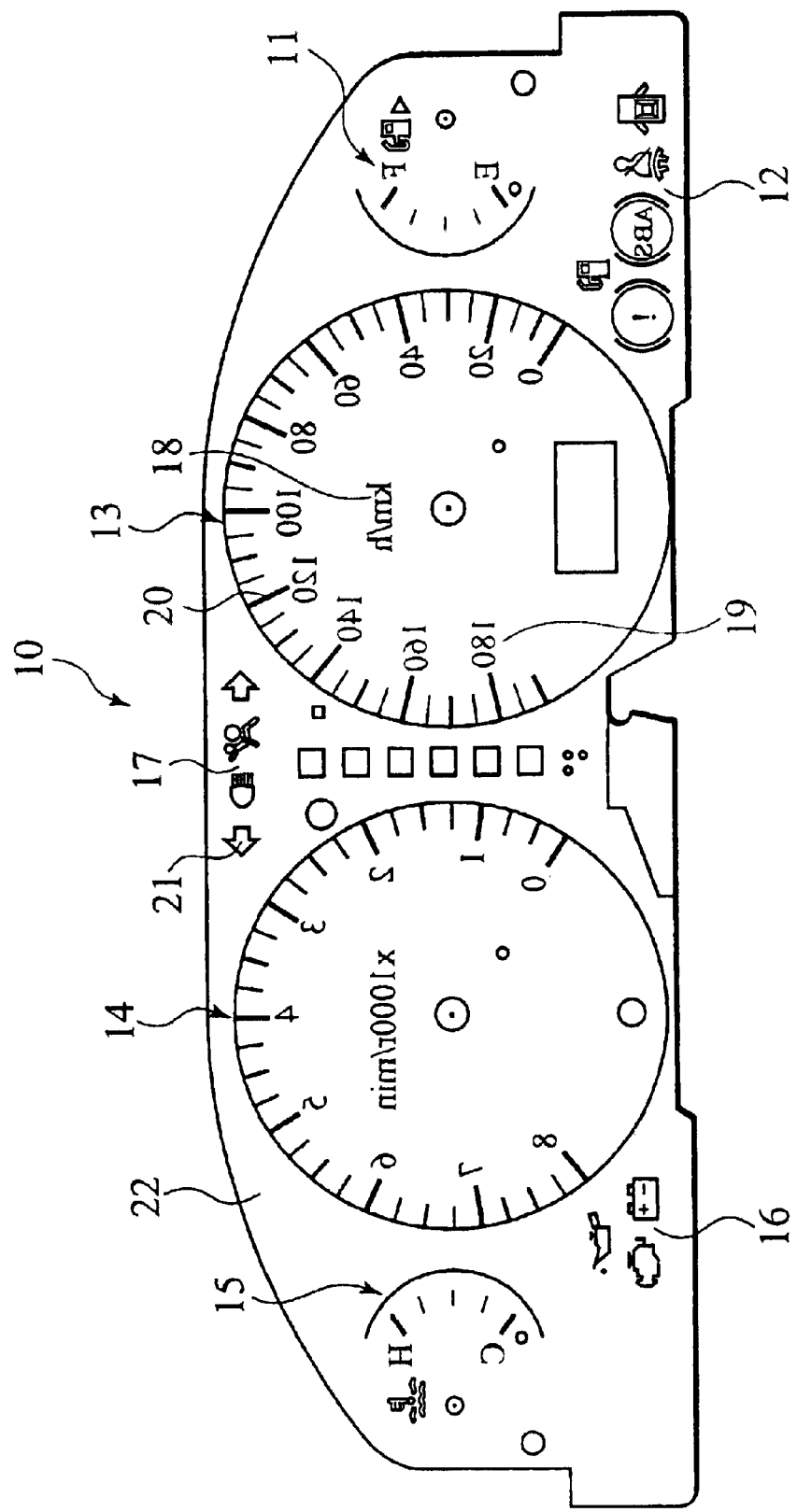
FIG. 2 is a rear view of the indicator panel of FIG. 1.

FIG. 2 shows a rear side of the indicator panel 10 and hence the meters, gages and indicia are turned over.

Figure 3:
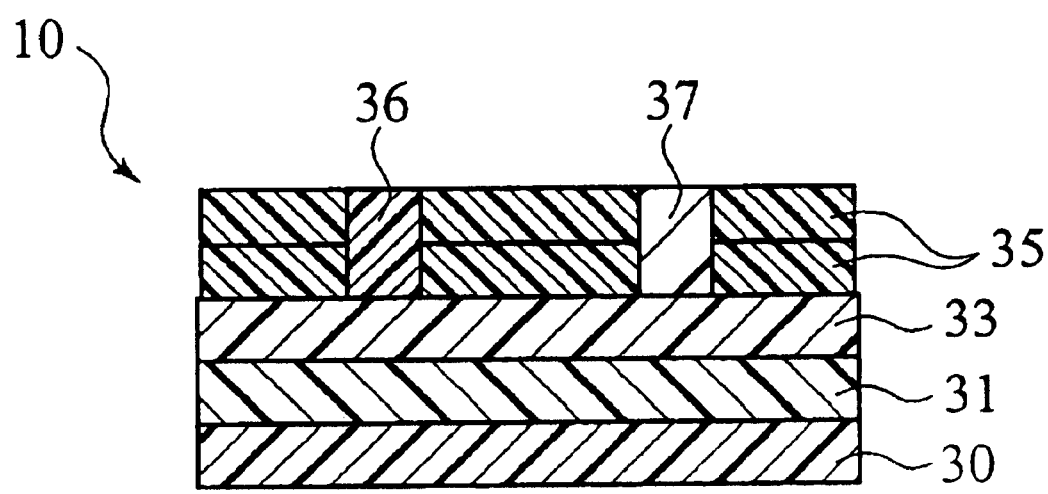
FIG. 3 is a schematic illustration of a cross section of the indicator panel, showing the vicinity of indicia printed thereon.

A cross section of the indicator panel 10 is schematically shown in FIG. 3, in which the vicinity of indicia and warning indicators is enlarged. A warning portion 36 is corresponding to any of the first through third warning indicators 12, 16 and 17. A transparent portion 37 is corresponding to any of the letters 18, scales 20 and such.

A base substrate 30 is made of a transparent synthetic resin such as polycarbonate (PC), polycarbonate ABS and ABS. An anchor layer 31 is coated on the base substrate 30 at a thickness of about 2 μm so as to have higher adhesion. An ink-acceptance layer 33 is coated further thereon at a thickness of around 20 μm. For coating the anchor layer 31 and the ink-acceptance layer 33, any coating method can be utilized. For example, a coater can be utilized and a screen printing method can also be utilized. The thickness of the ink-acceptance layer 33 may be from 10 to 40 μm, preferably from 20 to 30 μm.

Haze of the ink-acceptance layer 33 is set to be less than 93.5%, preferably more than 92.8% and less than 93.5%. Total luminous transmittance thereof is set to be not less than 40%, preferably not less than 40% and not more than 60%. The ink-acceptance layer 33 is composed of pigments, a binder resin, a water-repelling agent (an ink fixing agent) and various assistant agents.

To the pigments, for example, synthetic silica, calcium carbonate, alumina and colloidal silica can be applied. To the binder resin, for example, starch, polyvinyl alcohol (PVA), styrene-butadiene resin, polyvinyl pyrrolidone, acrylic resin, urethane resin and such can be applied. To the water-repelling agent (the ink fixing agent), polyamine compound, polyethylene imine series compound, dicyandiamide series condensate, cationic polyurethane resin, cationic acrylic acid derivative and such can be applied. To the assistant agents, a pigment dispersing agent, a viscosity improver, a flowability improving agent, an antifoaming agent, a release agent, a penetrant, a slip additive, alight stabilizer, an antioxidant, a preservative, a bridging agent and such can be applied.

Two shading layers 35 as a design are coated on the ink-acceptance layer 33 correspondingly to the shading portion 22, excepting the transparent portion 37. An ink-jet printing method can be applied to coating the shading layers 35 for example.

According to the ink-jet printing method, droplets of black-ink are countlessly sprayed and hence permeate on the ink-acceptance layer 33. The shading portion 22 of the ink-acceptance layer 33 has an enough absorbency so that the ink is prevented from blotting and prominence of the color is ensured. Thereby boundaries between the transparent portion 37 and the shading layers 35 are clearly formed so that clearness of the letters 18 and the scales 20 is ensured.

The shading portion 22 colored with the black-ink in an area rate of 100% nearly perfectly shields the backlighting lightened from a lower side of the indicator panel 10. The warning portion 36 colored with the black-ink in an area rate of 80% allows transmission of the backlighting but is not prominent against the shading portion 22 when the backlight is turned OFF because these are similarly colored.

Next, a production method of the indicator panel 10 according to the present embodiment will be described hereinafter.

First, the anchor layer 31 is coated on the base substrate 30 at a thickness of 2 $\mu$m with a coater for example. Various synthetic resins having transparency such as polycarbonate (PC), polycarbonate ABS and ABS can be applied to the base substrate 30.

Next, the ink-acceptance layer 33 is coated on the anchor layer 31 at a thickness of 20 $\mu$m with a coater and such.

The shading layers 35 are coated on the ink-acceptance layer 33 with the ink-jet printing method. At the shading portion 22, the black-ink is sprayed so as to form two layers and be in an area rate of 100%. At the warning portion 36, the black-ink is sprayed so as to form one layer and be in an area rate of 80%. At the transparent portion 37, the black-ink is not sprayed so that the color of the ink-acceptance layer 33 is in view. After forming the shading layers 35, moisture contained in the ink-acceptance layer 33 and the shading layers 35 is thermally dried. Meanwhile, the transparent portion 37 may be printed in blue, red and such colored inks so as to show desired colors. Moreover, after the aforementioned processes, an overcoat including UV absorbing agent may be further coated thereon.

Examples of the present embodiment of the invention will be described hereinafter.

First, anchor layers 31 were respectively coated on base substrates 30 made of polycarbonate at a thickness of 2 $\mu$m with utilizing a coater.

Next, ink-acceptance layers 33 were respectively coated on the anchor layers 31 with utilizing a coater so as to be undermentioned various haze quantities. Substantially, the thickness of the ink-acceptance layers 33 were restpectively set to be 8, 10, 15, 20, 25, 30, 35, 40 and 45 $\mu$m. Haze and total luminous transmittance of the respective indicator panels 10 including the base substrates 30, the anchor layers 31 and the aforementioned ink-acceptance layers 33 were as described in table 1 below.

TABLE 1

| | compositions of the ink-acceptance layers and performance | | | | | | | | | |
|---|---|---|---|---|---|---|---|---|---|---|
| ink-acceptance layer | thickness ($\mu$m) | 8 | 10 | 15 | 20 | 25 | 30 | 35 | 40 | 45 |
| | haze (%) | 92.2 | 92.8 | 93.2 | 93.2 | 93.3 | 93.3 | 93.4 | 93.4 | 93.5 |
| | total luminous transmittance (%) | 70 | 64 | 57 | 52 | 45 | 40 | 35 | 32 | 29 |
| contrast between the shading portion and the transparent portion | | good | good | good | good | good | good | mid. | mid. | bad |
| whiteness | | bad | bad | mid. | good | good | good | good | good | good |
| tranmittance | | good | good | good | good | good | mid. | mid. | mid. | bad |
| absorbance | | bad | bad | mid. | mid. | good | good | good | good | good |

The layer includes 20.01% in weight of benzotriazole series compound. The haze and the total luminous transmittance are measured in a state that the indicator panel includes both the ink-acceptance layer and the anchor layer.

Next, two layers of the shading layers 35 were respectively coated on the ink-acceptance layers 33 excepting the warning portions 36 and the transparent portions 37 with utilizing an ink-jet printing method. For the ink-jet printing, "MC2000" (SEIKO EPSON Corp.) was utilized. The warning portions 36 (first smoke layers) were coated on the left and colored with the black-ink in an area rate of 80%. The transparent portions 37 were coated on the right. Moisture contained therein was thermally dried.

Finally, overcoats including UV absorbing agent were coated thereon. "VS-15" (JUJO CHEMICAL Co., Ltd.) was applied to the overcoats.

Regarding thus produced indicator panels 10, thickness of the ink-acceptance layer, haze, total luminous transmittance were measured. Relationship between performance and the measured values is studied as described in Table 1.

As being understood from Table 1, good performance can be obtained in a case where haze is more than 92.8% and less than 93.5%. Furthermore, good performance can be obtained in a case where total luminous transmittance is not less than 40% and less than 60%.

In these examples, the ink-acceptance layers 33 include benzotriazole series compound. Benzotriazole series compound having a constitutional unit of polyalkylene glycol is preferable in view of light resistance. More specifically, polyethylene glycol are polypropylene glycol exemplified as the polyalkylene glycol and polyethylene glycol is more preferable among them. As a binder resin contained in the ink-acceptance layer 33, the aforementioned resins, natural resins, water base polyurethane resin having a constitutional unit of polycarbonate chain are preferable in view of light resistance.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An indicator panel for a vehicle instrument panel comprising:

a base substrate having transparency;

an ink-acceptance layer coated on at least one surface of the base substrate; and a shading layer coated further on the ink-acceptance layer;

wherein haze of the base substrate and the ink-acceptance layer is more than 92.8% and less than 93.5%.

2. The indicator panel of claim 1, wherein;

total luminous transmittance of the base substrate and the ink-acceptance layer is not less than 40% and less than 60%.

3. The indicator panel of claim 1, wherein:

the shading layer comprises one or more layers.

4. A method for manufacturing of an indicator panel for a vehicle instrument panel, the method comprising:

coating an ink-acceptance layer on at least one surface of a base substrate so that haze of the ink-acceptance layer and the base substrate is more than 92.8% and less than 93.5%; and printing a shading layer on the ink-acceptance layer.

5. The method of claim 4, wherein:

total luminous transmittance of the base substrate and the ink-acceptance layer is not less than 40% and less than 60%.

* * * * *